United States Patent
Tsunooka et al.

(10) Patent No.: US 6,230,795 B1
(45) Date of Patent: May 15, 2001

(54) AIR CONDITIONING APPARATUS FOR VEHICLE

(75) Inventors: Tatsuo Tsunooka, Kariya; Nobuyasu Naito, Iwakura; Yoshinobu Mochizuki, Kariya; Takeshi Nakamura, Anjo; Hiroshi Kanda, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/356,995

(22) Filed: Jul. 20, 1999

(30) Foreign Application Priority Data

Aug. 25, 1998 (JP) .................................................. 10-239030

(51) Int. Cl.$^7$ ...................................................... B60H 1/00
(52) U.S. Cl. .............................. 165/203; 165/42; 454/156
(58) Field of Search .............................. 165/42, 43, 202, 165/203; 454/121, 156

(56) References Cited

U.S. PATENT DOCUMENTS

| | | | |
|---|---|---|---|
| 4,665,971 | * 5/1987 | Sakurai | ................................ 165/203 |
| 4,791,981 | 12/1988 | Ito . | |
| 5,014,911 | * 5/1991 | Vincent | ............................... 165/42 X |
| 5,016,704 | * 5/1991 | Ono | ...................................... 165/42 X |
| 5,190,096 | * 3/1993 | Taniguchi et al. | ................. 165/42 X |
| 5,195,574 | * 3/1993 | Tanaka et al. | ..................... 165/42 X |
| 5,601,142 | * 2/1997 | Hildebrand et al. | ............. 454/121 X |

FOREIGN PATENT DOCUMENTS 3-189225   8/1991 (JP) .
5-278448  10/1993 (JP) .

* cited by examiner

Primary Examiner—Ira S. Lazarus
Assistant Examiner—Ljiljana V. Ciric
(74) Attorney, Agent, or Firm—Harness, Dickey & Pierce, PLC

(57) ABSTRACT

A vehicle air conditioning apparatus includes a shutting door for interrupting the air flow from a rear face air outlet and a rear face shutting switch for generating a shutting signal when the shutting door closes the rear face air outlet. An electronic control unit (ECU) controls the operation of a rear air mixing door so that communication between a rear bypass passage and a warm air passage downstream from a heater core is interrupted by the rear air mixing door when the shutting signal is generated from the rear face shutting switch.

14 Claims, 2 Drawing Sheets

AIR CONDITIONING APPARATUS FOR VEHICLE

This application is related to and claims priority from Japanese Patent Application No. Hei. 10-239030 filed on Aug. 25, 1998, the contents of which are hereby incorporated by reference.

BACKGROUND OF THE INVENTION

1. Field of the Invention

The present invention relates to an air conditioning apparatus for a vehicle, which can independently control temperature of air blown toward a front seat side and temperature of air blown toward a rear seat side in a passenger compartment.

2. Description of Related Art

In a conventional vehicle air conditioning apparatus, a front air mixing door and a rear air mixing door are independently disposed so that temperature of air blown toward a front seat side and temperature of air blown toward a rear seat side are independently controlled. Further, a rear face door for opening and closing a rear face air outlet is provided in the rear face air outlet. When air blown from the rear face air outlet is not necessary, the rear face air outlet is closed by the rear face door.

However, when the rear face air outlet is closed by the rear face door when the rear air mixing door is rotated at an opening position between a maximum cooling position and a maximum heating position, cool air on a downstream side of a cooling heat exchanger flows into a downstream side of the heating heat exchanger through a rear cool air bypass passage, and temperature of air blown toward the front seat side of the passenger compartment is decreased.

SUMMARY OF THE INVENTION

In view of the foregoing problems, it is an object of the present invention to provide an air conditioning apparatus for a vehicle, which can independently control temperature of air blown toward a front side and temperature of air blown toward a rear side in a passenger compartment, while preventing temperature of air blown into the passenger compartment from being changed even when an air outlet is closed.

According to the present invention, an air conditioning apparatus includes an interrupting unit for interrupting air blown from an air outlet, an interrupting signal generating unit for generating an interrupting signal when air blown from the air outlet is interrupted by the interrupting unit, and a control unit for controlling operation of an air mixing door for adjusting temperature of air blown toward the air outlet. In the air conditioning apparatus, the control unit controls the air mixing door in such a manner that a communication between a bypass passage through which air bypasses a heating heat exchanger and a warm air passage through which air having passed through the heating heat exchanger flows is interrupted by the air mixing door when the interrupting signal is generated from the interrupting signal generating unit. Thus, in the air conditioning apparatus, even when the air outlet is closed, temperature of air blown from the other air outlet is not changed.

Preferably, the air outlet is for blowing air toward a rear upper side of the passenger compartment, and the air ID mixing door is for adjusting temperature of air blown toward the rear upper side of the passenger compartment. Thus, in the air conditioning apparatus where temperature of air blown toward a front side of the passenger compartment and temperature of air blown toward a rear side of the passenger compartment are independently controlled, even when the air outlet is closed by the interrupting unit, the communication between the bypass passage and the warm air passage is interrupted by the air mixing door. Thus, it can prevent cool air in the bypass passage from being introduced into the warm air passage, thereby preventing temperature of air blown toward the front side of the passenger compartment from being decreased.

More preferably, the interrupting unit is a door for opening and closing the air outlet. Therefore, the air conditioning apparatus has a simple structure while accurately independently controlling temperature of air blown toward a front side and temperature of air blown toward a rear side of the passenger compartment.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the accompanying drawings. An air conditioning apparatus for a vehicle includes an air conditioning unit 10 shown in FIG. 1, and a blower unit (not shown). In the embodiment, the air conditioning unit 10 is disposed at an approximate center in a vehicle right-left direction, under an instrument panel in a passenger compartment of the vehicle. The blower unit is disposed at an offset position to be shifted from the air conditioning unit 10 toward a side in the vehicle right-left direction.

The blower unit has an inside/outside air switching box for switching and introducing inside air (i.e., air inside the passenger compartment) and outside air (i.e., air outside the passenger compartment), and a blower for blowing air toward the air conditioning unit 10.

The air conditioning unit 10 includes an evaporator (i.e., cooling heat exchanger) 12 and a heater core (i.e., heating heat exchanger) 13 which are integrally accommodated in a single common air conditioning case 11. The air conditioning case 11 is made of resin which has an elasticity to some degree and is superior in a strength, such as polypropylene. The air conditioning case 11 is composed of plural division cases which are integrally connected by a fastening member such as a metal spring clip and a screw, after the evaporator 12 and the heater core 13 and components such as a door are accommodated therein.

Figure 1:
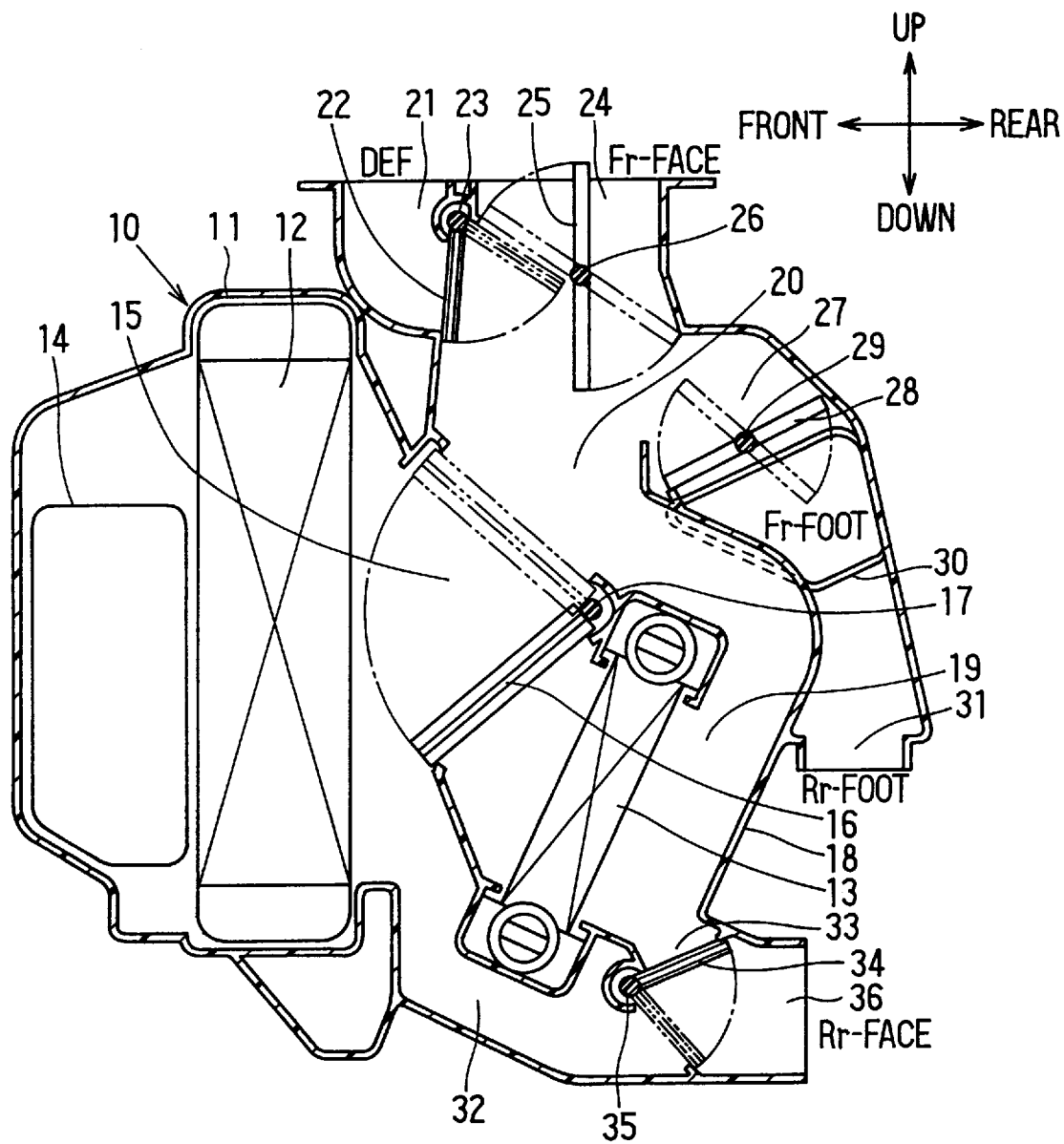
FIG. 1 is a schematic vertical sectional view showing an air conditioning unit of a vehicle air conditioning apparatus according to a preferred embodiment of the present invention.

The air conditioning unit 10 is disposed at a lower side of the instrument panel in the passenger compartment, and is arranged as shown in FIG. 1 in a vehicle front-rear direction and in a vehicle up-down direction. An air inlet 14 into which air blown by the blower unit flows is provided in the air conditioning case 11 at the vehicle front side.

The evaporator 12 is disposed within the air conditioning case 11 at an immediately downstream side of the air inlet 14. The evaporator 12 is thin in the vehicle front-rear direction, and is disposed in the air conditioning case 11 to cross an air passage in such a manner that a longitudinal direction thereof extends in the vehicle up-down direction. As being known well, the evaporator 12 cools air passing therethrough by absorbing an evaporation latent heat of refrigerant of a refrigerant cycle from the air.

A heater core 13 is disposed in the air conditioning case 11 on a downstream side of the evaporator 12 to form a predetermined distance between the evaporator 12 and the heater core 13. The heater core 13 is disposed on a lower side within the air conditioning case 11 to be inclined from the vehicle up-down direction toward a vehicle rear side. In the embodiment, each width dimension of the evaporator 12 and the heater core 13 in the vehicle right-left direction is approximately equal to a width dimension of the air conditioning case 11 in the vehicle right-left direction.

The heater core 13 heats air having passed through the evaporator 12 by using hot water (engine-cooling water) flowing therein as a heating source. A first cool air bypass passage 15 through which air having passed through the evaporator 12 bypasses the heater core 13 is provided at an upper position of the heater core 13 within the air conditioning case 11. The first cool air bypass passage 15 is provided for a front seat side in the passenger compartment.

A plate-like first air mixing door 16 for adjusting temperature of air blown toward a front seat side of the passenger compartment is disposed between the heater core 13 and the evaporator 12. The first air mixing door 16 adjusts the ratio between the amount of air passing through the heater core 13 and the amount of air bypassing the heater core 13. The first air mixing door 16 is integrally connected to the rotation shaft 17 disposed in a horizontal direction (i.e., vehicle right-left direction), and is rotated around a rotation shaft 17 in the vehicle up-down direction. By adjusting the rotation position of the first air mixing door 16 the, temperature of air blown toward the front seat side of the passenger compartment is adjusted.

The rotation shaft 17 is rotatably held in the air conditioning case 11. One end of the rotation shaft 17 protrudes from the air conditioning case 11 toward an outside, and is connected to an actuator such as a servomotor through a link mechanism. The rotation position of the first air mixing door 16 is adjusted by the actuator.

A wall member 18 extending in the up-down direction is formed integrally with the air conditioning case 11 at a downstream side (vehicle rear side) of the heater core 13 to form a predetermined distance between the heater core 13 and the wall member 18. A warm air passage 19 extending upwardly from an immediately downstream side of the heater core 13 is defined by the wall member 18. A downstream air side (upper side) of the warm air passage 19 and a downstream air side of the first cool air bypass passage 15 are joined in an air mixing chamber 20 where cool air from the first cool air bypass passage 15 and warm air from the warm air passage 19 are mixed.

A defroster opening portion 21 is opened on an upper wall surface of the air conditioning case 11 at a vehicle front side so that conditioned air is introduced into the defroster opening portion 21 from the air mixing chamber 20. The defroster opening portion 21 communicates with a defroster air outlet through a defroster duct, so that conditioned air is blown toward an inner surface of a windshield from the defroster air outlet.

The defroster opening portion 21 is opened and closed by a plate-like defroster door 22, and the defroster door 22 is rotated by a rotation shaft 23. A front face opening portion 24 is provided on the upper wall surface of the air conditioning case 11 at a vehicle rear side from the defroster opening portion 21. The front face opening portion 24 communicates with a front face air outlet provided on an upper side of the instrument panel, through a front face air duct, so that conditioned air is blown toward an upper side of a passenger on a front seat of the passenger compartment. The front face opening portion 24 is opened and closed by a plate-like front face door 25 rotated around a rotation shaft 26.

A foot passage inlet port 27 is provided on a lower side of the front face opening portion 24 in the air conditioning case 11, and is opened and closed by a plate-like front foot door 28 rotated around a rotation shaft 29. The foot passage inlet port 27 communicates with a front foot opening portion 30 which is provided on right and left side surfaces of the air conditioning case 11. Air blown from the front foot opening portion 30 is blown toward the foot area of a passenger on the front seat of the passenger compartment. Further, the foot passage inlet port 27 also communicates with a rear foot opening portion 31. The rear foot opening portion 31 communicates with a rear foot air outlet through a rear foot duct, so that conditioned air is blown toward the foot area of a passenger on a rear seat of the passenger compartment from the rear foot air outlet.

The defroster door 22, the front face door 25 and the foot door 28 are doors for switching an air outlet mode for a front seat of the passenger compartment. The rotation shafts 23, 26, 29 of the doors 22, 25, 28 are connected to an actuator to be operatively linked by the actuator.

On the other hand, a second cool air bypass passage 32 is provided on a lower side of the heater core 13 within the air conditioning case 11. A rear warm air inlet port 33 is formed at the lowest position of the warm air passage 19. The warm air inlet port 33 and the second cool air bypass passage 32 are joined at a joining portion, and a plate-like second air mixing door 34 rotated by a rotation shaft 35 is disposed in the joining portion. The second air mixing door 34 adjusts the ratio between the amount of air flowing from the warm air inlet port 33 and the amount of air flowing from the second cool air bypass passage 32, so that the temperature of air blown toward the rear seat side of the passenger compartment is adjusted by the second air mixing door 34.

Figure 2:
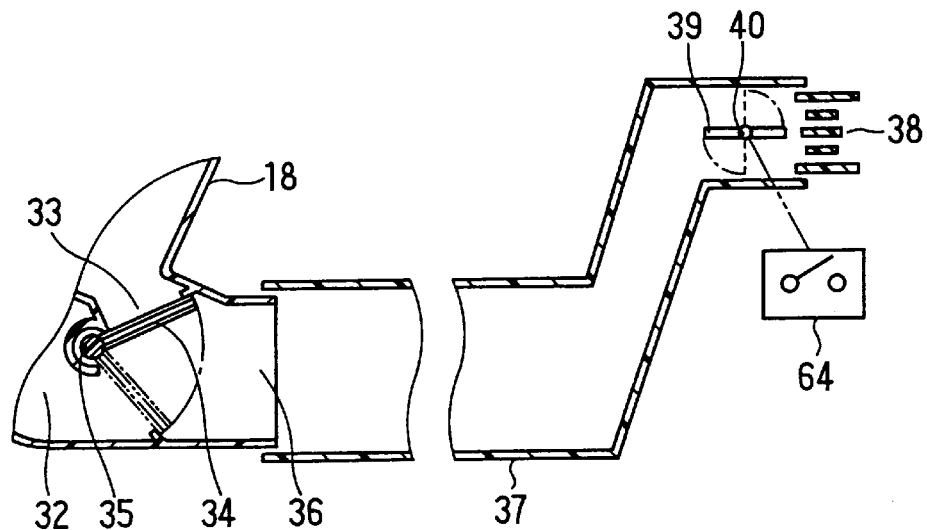
FIG. 2 is a partial sectional view showing a rear face air duct connected to a rear face opening portion of the air conditioning unit.

One end of the rotation shaft 35 protrudes to the outside of the air conditioning case 11, and is connected to an actuator such as a servomotor. The rotation position of the second air mixing door 34 is adjusted by the actuator. Air from the warm air inlet port 33 and air from the second cool air bypass passage 32 are mixed to have a predetermined temperature, and conditioned air flows into a rear face opening portion 36. As shown in FIG. 2, the rear face opening portion 36 communicates with a rear face air outlet 38 through a rear face air duct 37. The rear face air outlet 38 is provided on a rear side of the passenger compartment, so that air is blown toward the upper side of a passenger on a rear seat of the passenger compartment from the rear face air outlet 38.

As shown in FIG. 2, a plate-like shutting door (interrupting unit) 39 is disposed at an inlet portion of the rear face air outlet 38 on an upstream side of the rear face air outlet 38 so that the rear face air outlet 38 is opened and closed by the shutting door 39. That is, a flow of air blown from the rear face air outlet 38 can be interrupted by the shutting door 39. The shutting door 39 is rotated around a rotation shaft 40 by the rotation shaft 40. The rotation shaft 40 of the shutting door 39 is connected to an operation knob (not shown) disposed around the face air outlet 38 so that the shutting door 39 can be manually operated by a passenger through the operation knob. That is, the shutting door 39 can open and close the rear face air outlet 38 manually by a passenger through the operation knob.

Figure 3:
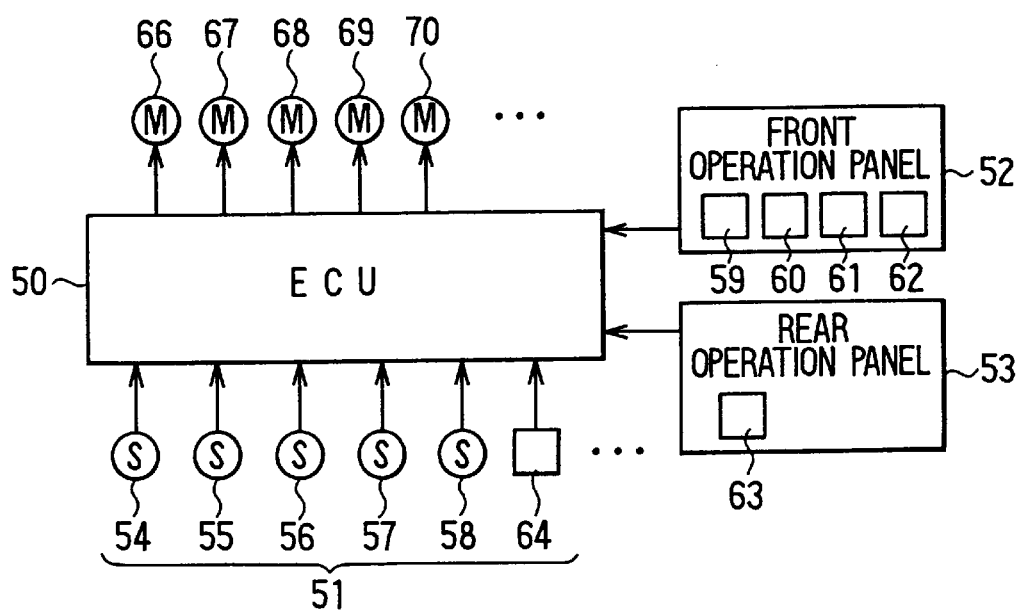
FIG. 3 is a block diagram of an electronic control unit (ECU) of the vehicle air conditioning apparatus according to the embodiment.

FIG. 3 is a block diagram for controlling the air conditioning apparatus by using an electronic control unit (ECU) 50. Each component of the air conditioning apparatus is automatically controlled by the ECU 50. That is, the ECU 50 controls the blower unit and the air conditioning unit 10 according to a pre-set program. When an engine ignition switch is turned on, electrical power is supplied from a vehicle battery to the ECU 50.

As shown in FIG. 3, sensor signals from a sensor group 51, operation signals from a front operation panel 52 provided in the instrument panel at a front side of the passenger compartment and from a rear operation panel 53 provided at a rear seat side in the passenger compartment are respectively input to the ECU 50. The sensor group 51 includes an outside air temperature sensor 54 for detecting the temperature of outside air (i.e., air outside the passenger compartment), an inside air temperature sensor 55 for detecting the temperature of inside air (i.e., air inside the passenger compartment), a sunlight sensor 56 for detecting the amount of sunlight entering the passenger compartment, an evaporator temperature sensor 57 for detecting the temperature of air cooled by the evaporator 15 (i.e., the temperature of air immediately after passing through the evaporator 12), and a water temperature sensor 58 for detecting the temperature of hot water flowing into the heater core 16. Further, a signal from a rear face shutting switch 64 is input into the ECU 50. In the embodiment, the rear face shutting switch 64 is used as a shutting signal generator for generating a signal in accordance with the state of the rear face air outlet 38. The rear face shutting switch 64 is composed of a micro-switch which is operated in accordance with the operation state of the shutting door 39. For example, when the shutting door 39 closes the rear face air outlet 38, the rear face shutting switch 64 is turned on. For example, when the shutting door 39 closes the rear face air outlet 38, a shutting signal is generated from the rear face shutting switch 64 and is input into the ECU 50.

On the front operation panel 52, a front seat side setting unit such as a front seat side temperature setting unit 59, a front seat side air amount setting unit 60, a front seat side air outlet mode setting unit 61 and an inside/outside air mode setting unit 62 is provided. Similarly, on the rear operation panel 53, a rear seat side setting unit such as a rear seat side temperature setting unit 63 is provided. Further, a driving unit for driving each air conditioning equipment is controlled by the ECU 50. The driving unit includes a motor 66 for driving inside/outside air selecting doors (not shown) of the inside/outside air switching box, a motor 67 for driving the blower, a motor 68 for driving the rotation shaft 17 of the first air mixing door 16, a motor 69 for driving doors 22, 25, 28 and a motor 70 for driving the second air mixing door 34.

Next, operation of the air conditioning apparatus according to the embodiment will be now described.

(1) FACE AIR OUTLET MODE

When the face air outlet mode is set based on a signal from the front seat side air outlet mode setting unit 61 or a calculated result in the ECU 50, the defroster door 22 is rotated to the solid line position in FIG. 1 to fully close the defroster opening portion 21, the front face door 25 is rotated to the solid line position in FIG. 1 to fully open the front face opening portion 24, and the foot door 28 is operated in the solid line position in FIG. 1 to fully close the foot passage inlet port 27. At this time, when the first air mixing door 16 is rotated to the solid line position in FIG. 1 by control of the ECU 50, a maximum cooling is set so that a ventilation passage of the heater core 13 is closed and the first cool air bypass passage 15 is fully opened. In this case, when the blower unit and the refrigerant cycle are operated, air blown by the blower unit flows into the air conditioning case 11 from the air inlet 14, and is cooled by the evaporator 12.

During the maximum cooling, air cooled by the evaporator 12 passes through the first cool air bypass passage 15 and the air mixing chamber 20, and is blown toward the upper side of the passenger on the front seat of the passenger compartment from the front face opening portion 24.

On the other hand, when the second air mixing door 34 is rotated to the solid line position in FIG. 1 by the control of the ECU 50, the rear warm air inlet 33 of the warm air passage 19 is closed and the second cool air bypass passage 32 is fully opened. Therefore, air cooled by the evaporator 12 passes the second cool air bypass passage 32 and flows toward the rear face opening portion 36. Air in the rear face opening portion 36 flows into the rear face air outlet 38 through the rear face air duct 37, and is blown toward the upper side of the passenger on the rear seat of the passenger compartment.

When the first air mixing door 16 is operated from the solid line position (maximum cooling position) in FIG. 1 to an intermediate opening position to control the temperature of air blown into the passenger compartment, air having passed through the evaporator 12 is introduced into both of the first cool air bypass passage 15 and the heater core 13 in accordance with the rotation position of the first air mixing door 16. Air from the first cool air bypass passage 15 and air from the warm air passage 19 are mixed in the air mixing chamber 20 so that conditioned air having a predetermined temperature is obtained in the air mixing chamber 20.

Similarly, when the second air mixing door 34 is operated from the solid line position in FIG. 1 to an intermediate opening position, a ratio between the amount of air from the second cool air bypass passage 32 and the amount of air from the warm air inlet port 33 is adjusted by the second air mixing door 34, so that the temperature of air blown toward a rear upper side of the passenger compartment is adjusted. Thus, in the embodiment, the temperature of air blown toward the front seat side of the passenger compartment and the temperature of air blown from the rear seat side in the passenger compartment can be independently controlled by independently controlling the rotation positions of the first and second air mixing doors 16, 34.

In the ECU 50, a front target air temperature is calculated based on signals from the sensor group 51 and a front seat side set temperature, and the rotation position of the first air mixing door 16 is determined so that the temperature of air blown toward the front seat side of the passenger compartment becomes to be equal to the front target air temperature. Similarly, in the ECU 50, a rear target air temperature is calculated based on signals from the sensor group 51 and a rear seat side set temperature, and the rotation position of the second air mixing door 16 is determined so that the temperature of air blown toward the rear seat side of the passenger compartment becomes to be equal to the rear target air temperature.

When no passenger is on the rear seat of the passenger compartment, or when air blown from the rear face air outlet 38 is not necessary, the shutting door 39 is manually operated by a passenger to shut the air flow from the rear face air outlet 38. During the shutting state of the shutting door 39, when the second air mixing door 34 is rotated to an intermediate opening position, cool air from the second cool air bypass passage 32 may be introduced into the warm air passage 19 through a space around the rear face opening portion 36 and the rear seat warm air inlet 33, and the temperature of air blown from the front face opening portion 24 may be decreased.

However, according to the embodiment of the present invention, when the shutting door 39 is operated to the shutting state so that the rear face air outlet 38 is closed, the rear face shutting switch 64 is turned on in accordance with the shutting state of the shutting door 39, and a shutting signal of the rear face air outlet 38 is input into the ECU 50. When the shutting signal where the rear face air outlet 38 is closed by the shutting door 39 is input into the ECU 50, a signal is output to the motor 70 for driving the second air mixing door 34 from the ECU 50, so that the second air mixing door 34 is compulsorily rotated to the maximum cooling position (the solid line position in FIG. 1) or the maximum heating position (the chain line position in FIG. 2). As a result, the second air mixing door 34 is operated to the maximum cooling position or the maximum heating position, and a communication between the second cool air bypass passage 32 and the warm air passage 19 is interrupted by the second air mixing door 34. Thus, even when the rear face air outlet 38 is closed by the shutting door 39 during a temperature control state for controlling the temperature of air blown into the passenger compartment, it can sufficiently prevent air from the second cool air bypass passage 32 from being introduced into the warm air passage 19. Accordingly, it can prevent the temperature of air blown from the front face air outlet 24 from being decreased due to air introduced from the second cool air bypass passage 32.

(2) BI-LEVEL AIR OUTLET MODE

When the bi-level air outlet mode is set, the defroster door 22 is rotated to the solid line position in FIG. 1 to close the defroster opening portion 21, the face door 25 and the foot door 28 are respectively rotated to the chain line positions in FIG. 1 to open the front face opening portion 24 and the foot passage inlet port 27.

Because the bi-level mode is generally set in the intermediate season such as the spring and the autumn, the first air mixing door 16 is generally rotated to an opening position so that air blown into the passenger compartment is adjusted. Therefore, during the bi-level mode, air is simultaneously blown toward both upper and lower front sides of the passenger compartment from both of the front face opening portion 24 and the front foot opening portion 30.

Further, by rotating the second air mixing door 35 to an intermediate opening position, conditioned air having a predetermined temperature is introduced into the rear face air outlet 38 through the rear face opening portion 36 and the rear face air duct 37. Therefore, conditioned air is blown from the rear face air outlet 38 toward the upper portion of the passenger on the rear seat in the passenger compartment, and air from the foot passage inlet port 27 is blown toward the foot area of the passenger on the rear seat through the rear foot opening portion 31, simultaneously. Thus, during the bi-level air outlet mode, air is simultaneously blown toward both upper and lower sides of the passenger compartment, on both of the front seat side and rear seat side.

Even during the bi-level air outlet mode, when the shutting door 39 closes the rear face air outlet 38, the rear face shutting switch 64 is turned on with the operation of the shutting door 39, and the second air mixing door 34 is compulsorily operated to the maximum cooling position or the maximum heating position by the ECU 50 based on the shutting signal from the rear face shutting switch 64. As a result, the communication between the second cool air bypass passage 32 and the warm air passage 19 is interrupted by the second air mixing door 34, thereby preventing cool air from the second cool air bypass passage 32 from being introduced into the warm air passage 19 on an immediately downstream side of the heater core 13.

(3) FOOT AIR OUTLET MODE

When the foot air outlet mode is set, the defroster door 22 is rotated from the solid line position in FIG. 1 to an opening position to slightly open the defroster opening portion 21. Further, the front face door 31 is rotated to the chain line position in FIG. 1 to close the front face opening portion 24, and the front foot door 28 is rotated to the chain line position in FIG. 1 to fully open the foot passage inlet port 27. At this time, when the first air mixing door 16 is operated to the chain line position in FIG. 1, the maximum heating is set during the foot air outlet mode so that the first cool air bypass passage 15 is fully closed and the ventilation passage of the heater core 13 is fully opened. In this case, air blown from the blower unit is introduced into the air inlet 14, passes through the evaporator 12, and flows into the heater core 13 to be warm air. The warm air passes through the warm air passage 19 upwardly, and is introduced into the air mixing chamber 20. Air in the air mixing chamber 20 is introduced into the foot passage inlet port 27, and it flows toward the front foot opening portion 30. Thereafter, warm air is blown toward the foot area of a passenger on the front seat of the passenger compartment. Simultaneously, a part of warm air from the foot passage inlet port 27 flows toward the rear foot opening portion 31, and is blown toward the foot area of the passenger on the rear seat from the rear foot opening portion 31.

On the other hand, when the foot air outlet mode is set during the winter, the shutting door 39 generally closes the rear face air outlet 38 so that air-conditioning performance is improved. When the shutting door 39 closes the rear face air outlet 38, the rear face shutting switch 64 is turned on, and second air mixing door 34 is compulsorily rotated to the maximum cooling position or the maximum heating position. Therefore, it can prevent air from passing through the second cool air bypass passage 32.

Further, when the first air mixing door 16 is rotated from the chain line position (i.e., maximum heating position) in FIG. 1 to an opening position, the ratio between the amount of air passing through the heater core 13 and the amount of air bypassing the heater core 13 is adjusted, thereby adjusting the temperature of air blown toward a front lower side and a rear lower side in the passenger compartment. Thus, during the foot air outlet mode, the temperature of air blown toward the front lower side of the passenger compartment and the temperature of air blown toward the rear lower side of the passenger compartment are adjusted to the same temperature by the first air mixing door 16.

During the foot air outlet mode, the ratio of the air amount from the defroster opening portion 21 to the air amount from the front foot opening portion 30 is generally set to ⅔.

However, by increasing the opening degree of the defroster opening portion 21, the ratio of the air amount from the defroster opening portion 21 to the air amount from the front foot opening portion 30 can be set to approximately ⅗. That is, by increasing the opening degree of the defroster opening portion 21, a foot/defroster air outlet mode can be set from the foot air outlet mode.

(4) DEFROSTER AIR OUTLET MODE

When the defroster air outlet mode is set, the defroster door 22 is rotated to the chain line position in FIG. 1 to fully open the defroster opening portion 21, the front face door 25 closes the front face opening portion 24, and the front foot door 28 closes the foot passage inlet port 27. During the defroster air outlet mode, when the shutting door 39 closes the rear face air outlet 38 to prevent air from being blown from the rear face air outlet 38, the rear face shutting switch 64 is turned on, and the second air mixing door 34 is compulsorily operated to the maximum cooling position or the maximum heating position by the ECU 50 based on the signal from the rear face shutting switch 64. Thus, it can prevent air from passing through the second cool air bypass passage 32.

During the defroster air outlet mode, when the first air mixing door 16 is operated to the chain line position (the maximum heating position), all air blown from the blower unit is heated by the heater core 13, and is blown toward the inner surface of the windshield after passing through the warm air passage 19 and the defroster opening portion 21.

Although the present invention has been fully described in connection with the preferred embodiment thereof with reference to the accompanying drawings, it is to be noted that various changes and modifications will become apparent to those skilled in the art.

For example, in the above-described embodiment, the rear face shutting switch 64 operatively linked with the shutting door 39 is provided, and the second air mixing door 34 is controlled by the ECU 50 based on a signal from the rear face shutting switch 64. However, a shutting switch operatively linked with a rear door for opening and closing a rear air outlet may be provided, and the second air mixing shutting door 39 may be controlled by the ECU 50 based on a signal from the shutting switch, similarly to the above-described embodiment. Further, the shutting switch may be provided to be operatively linked with a door for opening and closing an air outlet through which air is blown into a front side of the passenger compartment.

In the above-described embodiment, the shutting door 39 rotated around the rotation shaft 40 is disposed at the inlet of the rear face air outlet 38, and the shutting door 39 is used as an interrupting unit for interrupting an air flow from the rear face air outlet 38. However, as the interrupting unit for interrupting air blown from the rear face air outlet 38, a grill rotatably provided in a frame of the rear face air outlet 38 may be used. In this case, air blown from the rear face air outlet 38 may be closed by the grill. Further, the interrupting unit may be disposed in the rear face air duct 37 or may be disposed in the other portion.

In the above-described embodiment, the shutting door 39 of the rear face air outlet 38 is manually operated by a passenger. However, the shutting door 39 may be automatically operated by an actuator. Further, a rear face shutting switch may be provided on the rear seat operation panel 53. In this case, when the rear face shutting switch provided on the rear seat operation panel 53 is turned on, the actuator for driving the shutting door 39 is operated by the ECU 50, and a rear face shutting signal is generated from the rear face shutting switch.

In the above-described embodiment, when the foot air outlet mode or the defroster air outlet mode is set and air blown from the rear face air outlet 38 is not necessary, the shutting door 39 may automatically close the rear face air outlet 38 by ECU 50, and the second air mixing door 34 may be always operated to the maximum cooling position or the maximum heating position during the foot air outlet mode or the defroster air outlet mode.

Further, in the above-described embodiment, during the foot air outlet mode, the temperature of air blown toward the front lower side and the temperature of air blown toward the rear lower side are adjusted to the same temperature. However, the rear foot opening portion 31 may be provided at a downstream side of the second air mixing door 34, and temperature of air blown toward the rear foot opening portion 31 may be adjusted by the second air mixing door 34. In this case, the temperature of air blown toward the front lower side of the passenger compartment and the temperature of air blown toward the rear lower side of the passenger compartment can be independently controlled.

Such changes and modifications are to be understood as being within the scope of the present invention as defined by the appended claims.

What is claimed is:

1. An air conditioning apparatus for a vehicle having a passenger compartment, said air conditioning apparatus comprising:

an air conditioning case for forming an air passage, said air conditioning case having an opening portion for blowing air into the passenger compartment;

a cooling heat exchanger, disposed in said air conditioning case, for cooling air passing therethrough;

a heating heat exchanger for heating air from said cooling heat exchanger, said heating heat exchanger being disposed in said air conditioning case to form a bypass passage through which air having passed through said cooling heat exchanger bypasses said heating heat exchanger and to form a warm air passage through which air having passed through said heating heat exchanger flows;

an air mixing door for adjusting a ratio between an amount of air from said bypass passage and an amount of air from said warm air passage, in such a manner that air blown into the passenger compartment from said opening portion has a predetermined temperature;

an air duct connected to said opening portion of said air conditioning case, said air duct having an air outlet from which air is blown toward a side of the passenger compartment;

an interrupting unit for interrupting air blown from said air outlet;

interrupting signal generating means for generating an interrupting signal when air blown from said air outlet is interrupted by said interrupting unit; and control means for controlling operation of said air mixing door in such a manner that a communication between said bypass passage and said warm air passage is closed by said air mixing door when the interrupting signal is generated from said interrupting signal generating means.

2. The air conditioning apparatus according to claim 1, wherein:

said opening portion and said air outlet are for blowing air toward a rear upper side of the passenger compartment; and said air mixing door is for adjusting temperature of air blown toward the rear upper side of the passenger compartment.

3. The air conditioning apparatus according to claim 2, further comprising means for adjusting temperature of air blown toward a front side of the passenger compartment.

4. The air conditioning apparatus according to claim 1, wherein said interrupting unit is a door for opening and closing said air outlet.

5. The air conditioning apparatus according to claim 1, wherein said interrupting unit is a grill provided in said air outlet.

6. The air conditioning apparatus according to claim 1, the interrupting unit is disposed in said air duct.

7. The air conditioning apparatus according to claim 1, wherein said interrupting signal generating means is a switch operatively linked with said interrupting unit.

8. An air conditioning apparatus for a vehicle having a passenger compartment, said air conditioning apparatus comprising:

- an air conditioning case for forming an air passage, said air conditioning case having a first opening portion for blowing air toward a front side of the passenger compartment and a second opening portion for blowing air toward a rear side of the passenger compartment;
- a cooling heat exchanger, disposed in said air conditioning case, for cooling air passing therethrough;
- a heating heat exchanger for heating air from said cooling heat exchanger, said heating heat exchanger being disposed in said air conditioning case to form first and second bypass passages through which air having passed through said cooling heat exchanger bypasses said heating heat exchanger and to form a warm air passage through which air having passed through said heating heat exchanger flows;
- a first air mixing door for adjusting a ratio between an amount of air passing through said first bypass passage and an amount of air passing through said heating heat exchanger in such a manner that air blown toward the front side of the passenger compartment from said first opening portion has a predetermined temperature;
- a second air mixing door for adjusting a ratio between an amount of air from said second bypass passage and an amount from said warm air passage in such a manner that air blown toward the rear side of the passenger compartment from said second opening portion has a predetermined temperature;
- an air duct connected to said second opening portion of said air conditioning case, said air duct having a rear air outlet from which air is blown toward the rear side of the passenger compartment;
- an interrupting unit for interrupting air blown from said rear air outlet;
- interrupting signal generating means for generating an interrupting signal when air blown from said rear air outlet is interrupted; and
- control means for controlling operation of said second air mixing door in such a manner that a communication between said second bypass passage and said warm air passage is interrupted by said second air mixing door when the interrupting signal is generated from said interrupting signal generating means.

9. The air conditioning apparatus according to claim 8, wherein said second opening portion and said re air outlet are for blowing air toward a rear upper side of the passenger compartment.

10. The air conditioning apparatus according to claim 8, wherein said interrupting unit is a door for opening and closing said rear air outlet.

11. The air conditioning apparatus according to claim 8, wherein said interrupting unit is a grill provided in said rear air outlet.

12. The air conditioning apparatus according to claim 8, the interrupting unit is disposed in said air duct.

13. The air conditioning apparatus according to claim 8, wherein said interrupting signal generating means is a switch operatively linked with said interrupting unit.

14. The air conditioning apparatus according to claim 8, wherein said first bypass passage is provided at one side of said heating heat exchanger and said second bypass passage is provided at the other side of said heating heat exchanger.

* * * * *